Oct. 11, 1966 R. W. SIMPSON 3,278,189

TONE ARM RESTRICTOR FOR RECORD CHANGERS

Filed Nov. 14, 1963 2 Sheets-Sheet 1

INVENTOR.

Richard W. Simpson

BY

Brown, Jackson, Boettcher & Dienner

Att'ys.

TONE ARM RESTRICTOR FOR RECORD CHANGERS

Filed Nov. 14, 1963 2 Sheets-Sheet 2

INVENTOR.
Richard W. Simpson
BY
Brown, Jackson, Boettcher & Dienner
Att'ys.

United States Patent Office 3,278,189

Patented Oct. 11, 1966

3,278,189
TONE ARM RESTRICTOR FOR RECORD CHANGERS

Richard W. Simpson, Stevensville, Mich., assignor to V-M Corporation, Benton Harbor, Mich., a corporation of Michigan Filed Nov. 14, 1963, Ser. No. 323,739
9 Claims. (Cl. 274—23)

The present invention relates to a tone arm for a record changer and is particularly adapted for use with record changers of the type which can be pivoted upwardly into a cabinet when not in use. More specifically, the invention relates to a tone arm restrictor for limiting pivotal movement of a tone arm about its horizontal pivot axis, so that the record changer of which it is a part can be pivoted upwardly to an inoperative position wherein it is retracted within a cabinet without loss of control over the tone arm.

It is known in the art to provide a tip-up record changer which is pivotally mounted within a cabinet in such a manner that it can be pivoted between a horizontal operative position wherein it partially projects outwardly from the cabinet and a substantially inclined inoperative position wherein it is retracted within the cabinet. In other words, such a changer is disposed in the usual horizontal position when in use and in the horizontal position it will project somewhat from its cabinet for the convenience of the operator. When the changer is not in use it can be manually pivoted upwardly about a horizontal pivot axis into an inoperative position wherein it is fully retracted within the cabinet.

One of the principal problems presented by the use of tip-up changers is that when the changer is pivoted to its inclined inoperative position the tone arm will no longer be held by gravity on the rest post provided therefor, and such loss of control over the tone arm is highly undesirable, not only because extensive uncontrolled pivotal movement of the tone arm can cause damage to the cartridge and stylus carried thereby, but also because with many designs the tone arm if not restricted will be permitted to pivot to a position where it will interfere with the cabinet when the record changer is again moved toward its operative horizontal position. The conventional spring means used to balance a tone arm on its horizontal pivot will normally cause the tone arm to swing away from its rest post when the record changer is tilted to an angle of approximately 30 degrees. On the other hand, a positive stop which would absolutely prevent the tone arm from rising substantially above its normal at rest position would not provide a satisfactory solution to the foregoing problem, since it is desirable at certain times such as when replacing a stylus or cartridge to be able to raise the tone arm substantially above its normal operative position.

Accordingly, it is an object of the present invention to provide a tone arm restrictor which will normally prevent the tone arm from rising above a predetermined height, but which can be readily overcome when the tone arm is lifted manually in opposition to the restraining force of the restrictor.

Another object of the invention is to provide a tone arm restrictor which can be adjusted to vary the position to which the tone arm can be raised before being restrained.

A further object of the invention is to provide a tone arm restrictor of the type mentioned above comprising a pre-loaded spring member which is affixed to the tone arm for engagement with stop means when the tone arm is raised, whereby the pre-loading of the spring produces a high initial restraining load and provides more accurate control of the predetermined limiting position of the tone arm.

The foregoing and other objects and advantages of the invention will be apparent from the following detailed description, taken together with the accompanying drawings in which:

FIGURE 1 is an elevational view, partly in section, showing a tip-up record changer embodying the present invention housed within a cabinet provided therefor, the changer being shown in full lines in an inclined inoperative position wherein it is fully retracted within the cabinet, and being shown in dash lines in a horizontal operative position wherein it projects partially outwardly from the cabinet;

Figure 1:
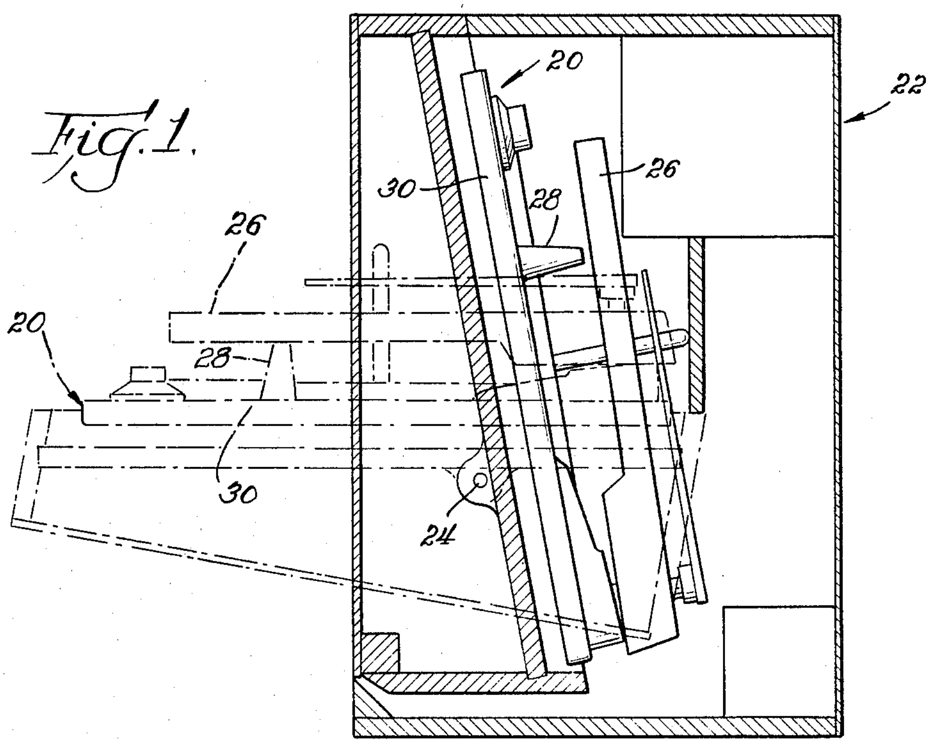

Referring now to the drawings, FIGURE 1 shows a record changer 20 which is mounted within a cabinet 22 for pivotal movement about a horizontal pivot 24. When the record changer 20 is in use it is pivoted to the horizontal position shown in dash lines wherein it projects outwardly from the front of the cabinet, and when not in use the record changer is pivoted upwardly to the position shown in full lines wherein it is fully retracted within the cabinet and is disposed at an angle of only approximately 10 degrees from the vertical. The record changer 20 includes a tone arm 26 which is movable upwardly and downwardly about a horizontal pivot axis and is also movable inwardly and outwardly in the usual manner about a vertical axis. With the record changer in its horizontal position as shown in dash lines, the tone arm 26 is shown in its at rest position wherein it is disposed on a rest post 28. Conventional mechanism may be provided to automatically position the tone arm 26 on the rest post 28 after the completion of the playing of the last record, at which time the record changer may also be automatically shut off.

When the record changer 20 is not to be used it may be manually pivoted about the pivot 24 to the position shown in full lines wherein it is fully retracted within the cabinet 22, and in such instances the tone arm restrictor of the present invention, which will be described fully hereinafter, is designed to control the position of the tone arm so as to prevent it from swinging any substantial distance from the baseplate 30. Thus, as shown in full lines in FIGURE 1, the tone arm 26 has moved slightly away from the rest post 28, but such movement is restricted so as to avoid damage to the tone arm or to the usual cartridge and stylus which it carries. In addition, such restriction of the tone arm prevents it from falling to a position within the cabinet where it would interfere with the cabinet when the record changer is again pivoted to its horizontal operative position.

Figure 2:
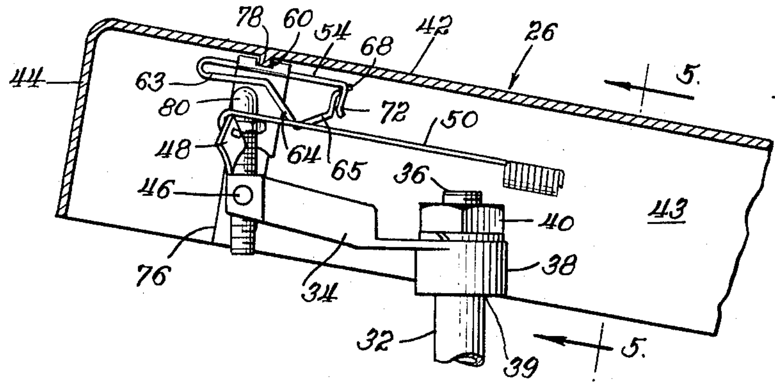
FIGURE 2 is an enlarged fragmentary vertical section, taken through the rear end of a tone arm disposed approximately in normal playing position, showing the tone arm restrictor of the present invention for limiting upward pivotal movement of the tone arm.
Figure 7:
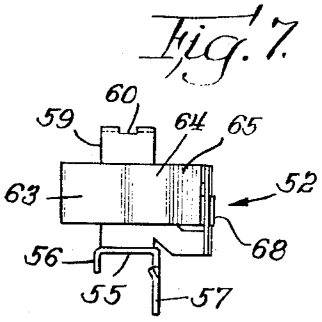
FIGURE 7 is a bottom plan view of the spring member of FIGURE 6.

FIGURE 2 shows a stationary tone arm mounting post 32 which is disposed vertically and is adapted to extend upwardly from the base plate 30. A hinge plate 34 is mounted on the upper end of the tone arm post 32 for rotation about the vertical axis of the post. The post 32 comprises an upper end portion 36 of reduced diameter which extends through a sleeve 38 formed integral with the hinge plate 34, and the sleeve is vertically supported on a shoulder 39 formed on the post 32 at the lower end of the reduced portion. A nut 40 is threaded on the upper end of the reduced portion 36 so as to retain the hinge plate 34 thereon, the nut being spaced from the upper end of the sleeve 38 so as not to prevent rotation of the latter relative to the post.

Figure 5:
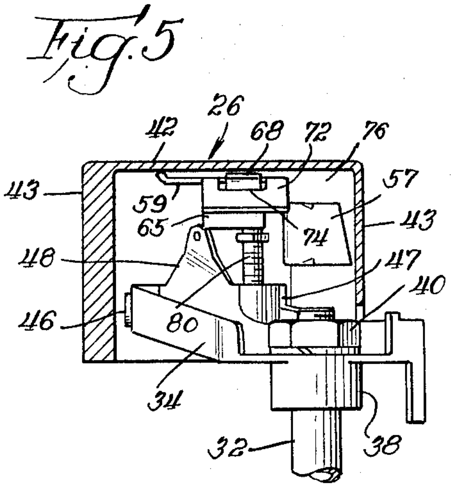
FIGURE 5 is a sectional view taken substantially along the line 5—5 of FIGURE 2.

The tone arm 26 comprises a housing including a top wall 42, a pair of side walls 43, and a rear end wall 44, the housing being approximately of an inverted U-shape in cross section as is conventional in the art. The hinge plate 34 has a pair of oppositely disposed recesses 46 and 47 (see FIGURES 2 and 5) which are adapted to seat pivot pin means carried by the tone arm so as to define a horizontal axis of rotation for the tone arm (which axis is perpendicular to the paper as viewed in FIGURE 2). The hinge plate 34 is provided with an upwardly extending tab 48, and a tension spring 50 has one end connected to the tab 48 and its other end (not shown) adjustably anchored to the tone arm so as to control the force which the stylus exerts upon a record during the playing thereof. It will be noted that it is the balancing spring 50 which tends to cause the tone arm to swing away from the baseplate 30 as soon as the record changer is tilted toward a vertical position.

Figure 6:
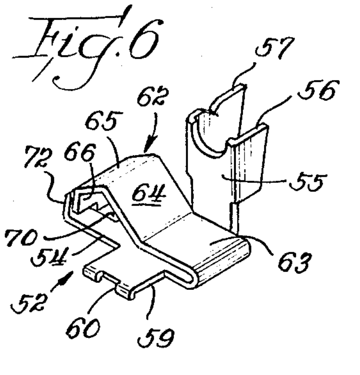
FIGURE 6 is a detail perspective view of the underside of a pre-loaded spring member which comprises one component of the tone arm restrictor and which is shown mounted on the tone arm in FIGURES 2–5.
Figure 8:
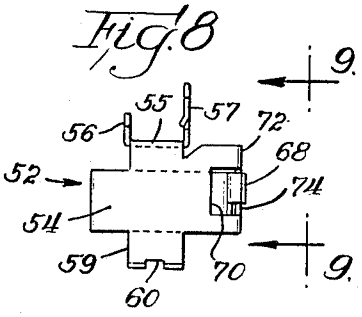
FIGURE 8 is a top plan view of the spring member of FIGURE 6.
Figure 9:
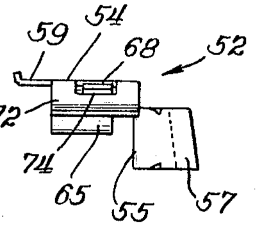
FIGURE 9 is a side elevational view looking substantially in the direction of the arrows 9—9 of FIGURE 8.

FIGURE 6 shows a leaf spring member 52 which may be stamped from a sheet of metal and bent to the configuration shown. The spring 52 comprises a fixed base portion 54, a bracket 55 having a pair of clamp arms 56 and 57, a tap 59 having a locating notch 60 formed therein, and a spring arm indicated generally at 62. The spring arm 62 includes a portion 63 which is approximately parallel to the base 54, a first inclined cam section 64 which extends away from the base 54, a second inclined cam section 65 which extends back toward the base, a portion 66 which extends toward the base and is approximately perpendicular thereto, and a locking tab 68 which is formed on the end of the portion 66 and extends through an aperture 70 provided in the base 54 and in a bent end tab 72. The spring arm 62 is pre-loaded so as to be biased away from the base 54, but the tab 68 abuts against an edge 74 (see FIGURES 8 and 9) so as to hold the spring arm in its loaded position as shown in FIGURE 6.

The spring member 52 is mounted on the tone arm 26 as shown in FIGURES 2–5. The tone arm has an internal vertical (when the tone arm is horizontally disposed) rib 76 formed on one of the side walls 43, and the bracket 55 of the spring member is adapted to fit over and grip such rib in order to hold the spring member mounted in the tone arm. Thus, the bracket arms 56 and 57 grip opposite sides of the rib 76 (see FIGURE 4) to hold the spring member 52 in place. In addition, a smaller transverse rib 78 is formed across the under side of the top wall 42 of the tone arm housing, generally parallel to the horizontal pivot axis 46, and when the spring member 52 is properly assembled the rib 78 projects into the notch 60 provided in the tap 59 of the spring member so as to further locate the latter. It will of course be understood that various means may be utilized to fasten the spring member 52 within the tone arm 26 other than the clamping bracket disclosed in connection with the embodiment being described.

It will be seen that when the spring member 52 is assembled within the tone arm, the spring arm 62 is disposed downwardly, with the inclined cam portion 64 disposed generally rearwardly and the inclined cam portion 65 disposed generally forwardly (toward the outer end of the tone arm which mounts a cartridge and stylus in conventional manner). A rigid screw 80 is adjustably mounted on the hinge plate 34 so as to project upwardly therefrom a predetermined amount. The screw 80 is perpendicular to the tone arm horizontal pivot axis 46 and is in approximate intersecting relation therewith, and the upper end of the screw is adapted to cooperate with the inclined cam surfaces 64 and 65 on the spring arm 62 in order to control the position of the tone arm.

In operation, FIGURE 2 shows the tone arm 26 in normal playing position wherein the upper end of the screw 80 is in spaced relation to the adjacent cam surface 64 on the spring arm 62. When the tone arm is lifted a predetermined distance to the position of FIGURE 3, the screw 80 will be engaged by the inclined spring section 64 so as to restrain the tone arm against further upward pivotal movement. The spring arm 62 is pre-loaded and thus when the tone arm reaches the position of FIGURE 3 the spring arm will develop a high initial load and thereby accurately control the position to which the tone arm can be raised freely without restriction.

It will of course be understood that the tone arm restrictor must not interefere with movement of the tone arm during a normal record change cycle wherein the tone arm is lifted from a record and swung outwardly to permit another record to be dropped to a turntable, and thus the spring arm 62 and screw 80 are relatively positioned so as not to abut one another during a record change cycle. However, when the record changer is not in use and is tipped up from the horizontal position shown in dash lines in FIGURE 1 to the inclined position shown in full lines therein, the tone arm 26 will be able to pivot only a limited amount about its horizontal pivot axis 46, after which the spring arm 62 will engage the screw 80 as in FIGURE 3. The screw 80 is threaded into the hinge plate 34 and thus its height can be varied to adjust the limiting position of the tone arm.

Figure 4:
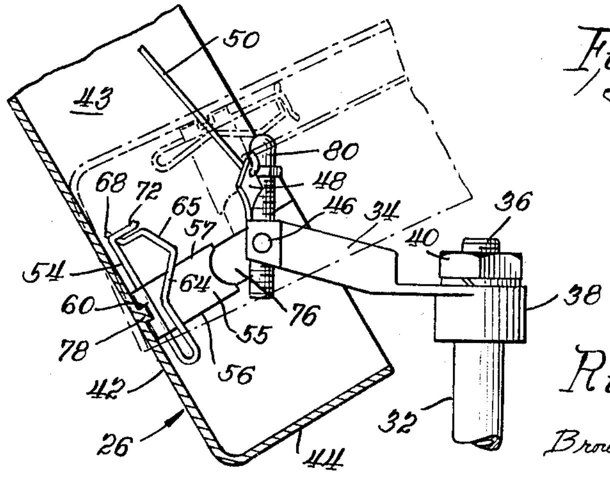
FIGURE 4 is a view similar to FIGURE 2 wherein the tone arm is shown in dash lines as it is being manually raised past the tone arm restrictor and is shown in full lines in a conventional limiting position to which it can be moved after being manually forced past the restrictor.

In certain instances it is desirable to be able to pivot the tone arm upwardly about its horizontal pivot axis 46 to a conventional limiting position approximately as shown in FIGURE 4 wherein the tone arm has been pivoted beyond the vertical so as to be partially inverted, such position being determined by interference between the hinge plate 34 and the lower edge of one of the tone arm side walls 43. Thus, in order to replace a cartridge or a stylus it is desirable to be able to position the tone arm as in FIGURE 4. In accordance with the present invention the tone arm can be pivoted upwardly to the position of FIGURE 4 by manually overcoming the force of the spring arm 62. It is only necessary to manually lift the tone arm with sufficient force that the screw 80 will deflect the spring arm and thus permit the latter to move past the upper end of the screw.

FIGURE 4 shows the tone arm 26 in dash lines as the deflected spring is moving past the screw 80, and it shows the tone arm in full lines in its conventional limiting position. Once the tone arm has been forcibly moved past the restricted position it can be returned to the position of FIGURE 2 by simply manually urging it toward such position whereby the cam portion 65 of the spring arm will be engaged and deflected out of the way by the screw 80. The strength of the pre-loaded spring arm 62 may be such that a force in the range of approximately 0.5 to 1.0 lb. is required at the outer stylus end of the tone arm to move it past the limiting position provided by the spring, but of course the precise strength of the spring is not critical as long as it is strong enough to prevent the tone arm from rising beyond the limiting position except when manual force is applied thereto.

Figure 3:
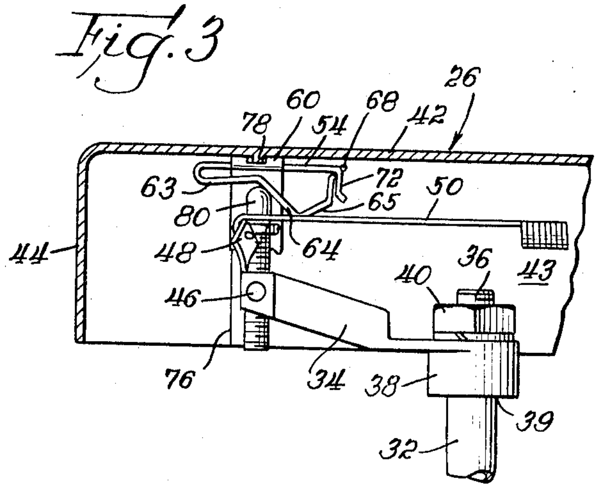
FIGURE 3 is a view similar to FIGURE 2 showing the tone arm raised to a predetermined position wherein further upward movement thereof is prevented except upon manual application of force to overcome the restraining force of the restrictor.

It will be understood from the foregoing description that the restricted position of the tone arm as indicated approximately in FIGURE 3 is high enough so that the restrictor will not interefere with the usual motions of the tone arm during a record change cycle, and yet will prevent any substantial pivoting of the tone arm about its horizontal axis when the record changer on which it is mounted is tipped up to an inoperative retracted position as shown in full lines in FIGURE 1. In the position of FIGURE 3 the stylus tip may be between approximately 1.125 and 1.75 inches above the turntable.

While I have described my invention in a preferred form, I do not intend to be limited to that form, except insofar as the appended claims are so limited, since modifications coming within the scope of my invention will readily occur to others with my disclosure before them.

I claim:

1. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means mounted on said hinge assembly, and second stop means carried on said tone arm and positioned thereon so as to engage said first stop means when the tone arm has been pivoted about said horizontal axis to a predetermined distance away from said hinge assembly and thereby restrain said tone arm against further upward pivotal movement, at least one of said stop means being yieldable beyond an initial restraining load therein so as to permit said tone arm to be moved above said predetermined distance by manual application of a lifting force to said tone arm sufficient to overcome the yieldable stop means.

2. The invention of claim 1 wherein said yieldable stop means is carried on said tone arm.

3. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means mounted on said hinge assembly, and second stop means carried on said tone arm and positioned thereon so as to engage said first stop means when the tone arm has been pivoted about said horizontal axis to a predetermined distance away from said hinge assembly and thereby restrain said tone arm against further upward pivotal movement, one of said stop means beind adjustable to permit selective adjustment of said predetermined distance, and at least one of said stop means being yieldable beyond an initial restraining load therein so as to permit said tone arm to be moved above said predetermined distance by manual application of a lifting force to said tone arm sufficient to overcome the yieldable stop means.

4. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means mounted on said hinge assembly and second stop means carried on said tone arm and positioned thereon so as to engage said first stop means when the tone arm has been raised to a predetermined height and thereby restrain said tone arm against further upward pivotal movement, one of said stop comprising a relatively rigid stop member, and the other of said stop means comprising a flexible spring arm so as to permit said tone arm to be moved above said predetermined height by manual application of a lifting force to said tone arm sufficient to overcome said spring arm.

5. The invention of claim 4 wherein said flexible spring arm is pre-loaded so as to develop a relatively high initial force upon engagement with said rigid stop member.

6. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means mounted on said hinge assembly, and second stop means carried on said tone arm and positioned thereon so as to engage said first stop means when the tone arm has been raised to a predetermined height and thereby restrain said tone arm against further upward pivotal movement, one of said stop means comprising a relatively rigid stop member which is adjustable to permit selective adjustment of said predetermined height, and the other of said stop means comprising a flexible spring arm so as to permit said tone arm to be moved above said predetermined height by manual application of a lifting force to said tone arm sufficient to overcome said spring arm.

7. The invention of claim 6 wherein said relatively rigid stop member is adjustably mounted on said hinge assembly and said flexible spring arm is carried on said tone arm.

8. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means comprising a relatively rigid stop member mounted on said hinge assembly, and second stop means comprising a spring arm including an inclined cam surface carried on said tone arm and positioned thereon in such a manner that said cam surface will engage said rigid stop member when the tone arm has been raised to a predetermined height and thereby restrain said tone arm against further upward pivotal movement, said spring arm being pre-loaded so as to develop a relatively high initial force upon engagement of its cam surface with said rigid stop member, and said tone arm being movable above said predetermined height by manual application of a lifting force to said tone arm sufficient to overcome the force of said spring arm.

9. A tone arm assembly for use with record changers of the type which are movable out of a horizontal position when not in use, the improvement comprising, in combination, a tone arm hinge assembly, a tone arm mounted adjacent one end thereof on said hinge assembly for upward and downward pivotal movement about a generally horizontal axis, first stop means comprising a rigid screw mounted on said hinge assembly, and second stop means comprising a pre-loaded spring arm including an inclined cam surface carried on said tone arm and positioned thereon in such a manner that said cam surface will engage said screw when the tone arm has been raised to a predetermined height and thereby restrain said tone arm against further upward pivotal movement, said screw being adjustably mounted on said hinge assembly to permit selective adjustment of said predetermined height, and said tone arm being movable above said predetermined height by manual application of a lifting force sufficient to overcome the force of said preloaded spring arm.

References Cited by the Examiner

UNITED STATES PATENTS 3,188,093 6/1965 Meyer -------------- 274—23

NORTON ANSHER, *Primary Examiner.*

C. B. PRICE, *Assistant Examiner.*